(12) United States Patent
Lee et al.

(10) Patent No.: US 11,045,676 B2
(45) Date of Patent: Jun. 29, 2021

(54) ACTIVATED CARBON SUPPORTED $Ni^0Fe^0$ NANOPARTICLES FOR REDUCTIVE TRANSFORMATION OF PERFLUOROALKYL-CONTAINING COMPOUNDS

(71) Applicant: Purdue Research Foundation, West Lafayette, IN (US)

(72) Inventors: Linda S Lee, West Lafayette, IN (US); Jenny E Zenobio, Arlington, MA (US)

(73) Assignee: Purdue Research Foundation, West Lafayette, IN (US)

( * ) Notice: Subject to any disclaimer, the term of this patent is extended or adjusted under 35 U.S.C. 154(b) by 192 days.

(21) Appl. No.: 16/056,646

(22) Filed: Aug. 7, 2018

(65) Prior Publication Data

US 2019/0060691 A1   Feb. 28, 2019

Related U.S. Application Data

(60) Provisional application No. 62/550,265, filed on Aug. 25, 2017.

(51) Int. Cl.
| | |
|---|---|
| A62D 3/34 | (2007.01) |
| B01J 23/755 | (2006.01) |
| C02F 1/70 | (2006.01) |
| C02F 1/28 | (2006.01) |
| B01J 21/18 | (2006.01) |
| A62D 3/37 | (2007.01) |
| B09C 1/00 | (2006.01) |
| B09C 1/06 | (2006.01) |
| B09C 1/08 | (2006.01) |
| C02F 103/06 | (2006.01) |
| A62D 101/22 | (2007.01) |
| C02F 101/36 | (2006.01) |

(52) U.S. Cl.
CPC .............. *A62D 3/34* (2013.01); *A62D 3/37* (2013.01); *B01J 21/18* (2013.01); *B01J 23/755* (2013.01); *B09C 1/002* (2013.01); *B09C 1/06* (2013.01); *B09C 1/08* (2013.01); *C02F 1/283* (2013.01); *C02F 1/705* (2013.01); *A62D 2101/22* (2013.01); *C02F 2101/36* (2013.01); *C02F 2103/06* (2013.01); *C02F 2305/08* (2013.01)

(58) Field of Classification Search
None
See application file for complete search history.

(56) References Cited

U.S. PATENT DOCUMENTS

| | | | |
|---|---|---|---|
| 6,217,779 B1 * | 4/2001 | Orth ...................... | A62D 3/34 210/747.5 |
| 2014/0235428 A1 * | 8/2014 | Pan ......................... | B01J 31/08 502/11 |

OTHER PUBLICATIONS

Hori H., et al., Efficient decomposition of environmentally persistent perfluorooctanesulfonate and related fluorochemicals using zerovalent iron in subcritical water. Environmental Science & Technology, 2006, 40, (3), 1049-1054.

Tian H., et al., Complete Defluorination of Perfluorinated Compounds by Hydrated Electrons Generated from 3-Indole-acetic-acid in Organomodified Montmorillonite, Scientific Reports vol. 6, Article No. 32949 (2016).

* cited by examiner

*Primary Examiner* — Anita Nassiri-Motlagh
(74) *Attorney, Agent, or Firm* — Purdue Research Foundation; Zhigang Rao

(57) ABSTRACT

The present application relates to a novel method for reductive degradation of perfluoroalkyl-containing compounds, such as perfluoroalkyl sulfonates, by activated carbon (AC) supported zero valent iron-nickel nanoparticles ($nNi^0Fe^0$).

10 Claims, No Drawings

ACTIVATED CARBON SUPPORTED Ni°Fe° NANOPARTICLES FOR REDUCTIVE TRANSFORMATION OF PERFLUOROALKYL-CONTAINING COMPOUNDS

CROSS-REFERENCE TO RELATED APPLICATION

This application claims the benefits of United States Provisional Application Ser. No. 62/550,265, filed Aug. 25, 2017. The contents of which are incorporated herein entirely.

GOVERNMENT SUPPORT CLAUSE

This invention was made with government support under W912HQ-14-C-0047 awarded by the United States Department of Defense. The government has certain rights in the invention.

TECHNICAL FIELD

The present application relates to a novel method for reductive degradation of perfluoroalkyl-containing compounds, such as perfluoroalkyl sulfonates, by activated carbon (AC) supported zero valent iron-nickle nanoparticles (nNi°Fe°).

BACKGROUND

This section introduces aspects that may help facilitate a better understanding of the disclosure. Accordingly, these statements are to be read in this light and are not to be understood as admissions about what is or is not prior art.

Management of diffuse perfluoroalkyl acid (PFAA) plumes at a large number of sites such as military bases, refineries, airports, and chemical plants above EPA recommended drinking water guidance levels calls for remediation technologies with in-situ potential. PFAAs have not been shown to biodegrade, and in fact, are generated from microbial degradation of precursor perfluoroalkyl substances (PFAS). Thus management strategies must focus on abiotic processes. Currently, adsorption technologies (e.g., granulated activated carbon, GAC) are primarily used to remediate PFAA-contaminated water. However, early PFAA breakthrough often occurs and GAC regeneration is problematic. Oxidative technologies amenable for in-situ remediation have generally proven unsuccessful particularly for the perfluoroalkyl sulfonates such as perfluorooctane sulfonate (PFOS, $C_8F_{17}SO_3$). Mineralization of perfluorocarboxylates (PFCAs) by heat-activated persulfate has been demonstrated, but PFOS was not altered. Vitamin B12-based technologies can defluorinate the branched (Br-) PFOS isomers, but not linear (L-) PFOS. About 70% of PFOS in the environment is L-PFOS.

The use of zero valent metals are attractive due to their low cost and use in passive treatment methods such as permeable reactive barriers (PRBs). PFOS degradation (~98% in 6 hours) by Fe° in sub- or supercritical water at 350° C. has been observed, but this approach is not conducive for in-situ applications. See Hori et al., Efficient decomposition of environmentally persistent perfluorooctane-sulfonate and related fluorochemicals using zerovalent iron in subcritical water. *Environmental Science & Technology*, 2006, 40, (3), 1049-1054.

Addition of a metal catalyst, e.g., Ni, Pt, Cu, or Pd, to Fe°, can enhance reactivity resulting in increased dehalogenation of halo-organic contaminants. For example, Pd has been shown to be effective for a wide range of contaminants; however, nPd°/Fe° was ineffective toward PFOS degradation.

There is, therefore an unmet need for a novel method to degrade perfluoroalkyl containing materials such as perfluoroalkyl sulfonates, more specifically, perfluorooctane sulfonate (PFOS).

SUMMARY

In one embodiment, the present disclosure provides a method of degradation of one or more perfluoroalkyl-containing compound, wherein the method comprises the use of zero valent iron (Fe°) and zero valent nickel (Ni°).

In one embodiment, the present disclosure provides a method of degradation of one or more perfluoroalkyl-containing compound, wherein the method comprises the use of zero valent iron (Fe°) and zero valent nickel (Ni°), wherein the zero valent iron (Fe°) comprises Fe° nanoparticles, and wherein the surface of the Fe° nanoparticles is coated with zero valent nickel (Ni°), and wherein the perfluoroalkyl-containing compound comprises perfluorooctane sulfonate (PFOS).

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "perfluoroalkyl containing materials" or "perfluoroalkyl containing compounds" refers to any compound, any salt or derivative of the compound that comprising an alkyl chain in which all the carbons are attached with fluoro (F) instead of proton (H) atoms. For example, an ethyl group is $CH_3$—$CH_2$—, while a perfluoroethyl is $CF_3$—$CF_2$—.

In the present disclosure the term "perfluoroalkyl sulfonate" may refer to the perfluoroalkyl sulfonate per se, or any salt, derivative such as acid, ester, or amide of the specific perfluoroalkyl sulfonate.

In the present disclosure the term "nanoparticles" refers particles with average particle sizes between 1-1000 nm, 1-900 nm, 1-800 nm, 1-700 nm, 1-600 nm, 1-500 nm, 1-400 nm, 1-300 nm, 1-200 nm, 1-100 nm, 1-90 nm, 1-80-nm, 1-70 nm, 1-60 nm, or 1-50 nm.

In the present disclosure the term 'in-situ" refers to the location of the remediation has occurred at the site of contamination without the translocation of the polluted materials.

In the present disclosure the term 'coated" refers to that iron nanoparticles can be physically or chemically coated by nickel metal.

In the present disclosure the term 'plated" refers to that iron nanoparticles can be coated by a nickel metal layer through a chemical reaction. A plated nickel layer is tight and is preferred as a specific coating for iron nanoparticles.

Perfluoroalkyl containing materials such as perfluorooctane sulfonate (PFOS), are globally ubiquitous, environmentally persistent, and recalcitrant to environmental degradation processes. The present disclosure demonstrated the performance of $Ni^0Fe^0$ nano (n) particles (NPs) supported on activated carbon (AC) to degrade linear (L-PFOS) and branched PFOS (br-PFOS) over time and the effects of different NP synthesis stirring times on PFOS removal in 1 d. Batch reactions with ~6 µM PFOS were carried out in triplicate at 22 and 60° C. for 1, 5, 10 or 20 days. PFOS was quantified in the aqueous phase and in particle extracts from five sequential extractions. At about 60° C., PFOS loss including linear PFOS was accompanied by sulfonate, and in some cases, fluoride generation for all $nNi^0$-containing particles. The greatest PFOS losses were observed with $nNi^0Fe^0$-AC with up to 48% transformation by $nNi^0Fe^0$-AC synthesized with 3 h of strong stirring. An exploratory kinetic study indicated that defluorination occurred first followed by desulfonation. Organic defluorination products were identified in the aqueous phase, particle extracts, and headspace samples. Therefore, AC-supported $nNi^0Fe^0$NPs provides a method for potential use in permeable reactive barriers as part of a treatment train for in-situ groundwater remediation.

Ni may be more reactive, less expensive, and less toxic than Pd as it offers a large range of stable oxidation states ($Ni^0/Ni^{+1}/Ni^{+2}/Ni^{+3}$).)

Nano-$Fe^0$ ($nFe^0$ has an increased surface area thereby increased reaction sites, but potential for aggregation may reduce accessibility to reaction sites.

In the present disclosure, the high specific surface area activated carbon (AC) was chosen as an NP support to minimize particle aggregation, thus facilitating highly accessible NP surface area and reactivity. AC has been frequently used as a heterogeneous catalyst and has an extremely high surface area, catalytic activity, thermal stability, and low cost. In addition, AC will aid in reducing PFAA mobility.

In one embodiment, the present disclosure provides a method of degradation of one or more perfluoroalkyl-containing compound, wherein the method comprises the use of zero valent iron ($Fe^0$) and zero valent nickel ($Ni^0$).

In one embodiment, the present disclosure provides a method of degradation of one or more perfluoroalkyl-containing compound, wherein the method comprises the use of zero valent iron ($Fe^0$) and zero valent nickel ($Ni^0$), wherein the zero valent iron ($Fe^0$) comprises $Fe^0$ nanoparticles, and wherein the surface of $Fe^0$ nanoparticles is coated with zero valent nickel ($Ni^0$).

In one embodiment, the present disclosure provides a method of degradation of one or more perfluoroalkyl-containing compound, wherein the method comprises the use of zero valent iron ($Fe^0$) and zero valent nickel ($Ni^0$), wherein the zero valent iron ($Fe^0$) comprises $Fe^0$ nanoparticles, and wherein the surface of $Fe^0$ nanoparticles is plated with zero valent nickel ($Ni^0$).

In one embodiment, the present disclosure provides that a composition comprising zero valent iron ($Fe^0$) and zero valent nickel ($Ni^0$), wherein the composition is further supported by active carbon powders.

In one embodiment, the present disclosure provides that a composition comprising zero valent iron ($Fe^0$) and zero valent nickel ($Ni^0$), wherein the composition is further supported by active carbon powders, wherein active carbon powders comprise active carbon nanoparticles.

In one embodiment, the present disclosure provides that the degradation is carried out between about 25-100° C., 45-80° C., 50-70° C., 60-65° C.

In one embodiment, the present disclosure provides that the degradation is carried out for in-situ groundwater remediation.

In one embodiment, the present disclosure provides that the weight percentage of the zero valent nickel ($Ni^0$) is 0.1% to 15% of the total weight of zero valent iron ($Fe^0$) and zero valent nickel ($Ni^0$). In one aspect, the weight percentage of the zero valent nickel ($Ni^0$) is 0.5% to 5.0% of the total weight of zero valent iron ($Fe^0$) and zero valent nickel ($Ni^0$). In one aspect, the weight percentage of the zero valent nickel ($Ni^0$) is 1.0% to 3.0% of the total weight of zero valent iron ($Fe^0$) and zero valent nickel ($Ni^0$). In one aspect, the weight percentage of the zero valent nickel ($Ni^0$) is about 2.0% of the total weight of zero valent iron ($Fe^0$) and zero valent nickel ($Ni^0$).

In one embodiment, the present disclosure provides that the weight percentage of active carbon powders is 1% to 30% of the total weight of zero valent iron ($Fe^0$), zero valent nickel ($Ni^0$), and active carbon powders. In one aspect, the weight percentage of active carbon powders is 1% to 30% of the total weight of zero valent iron ($Fe^0$), zero valent nickel ($Ni^0$), and active carbon powders. In one aspect, the weight percentage of active carbon powders is 5% to 20% of the total weight of zero valent iron ($Fe^0$), zero valent nickel ($Ni^0$), and active carbon powders. In one aspect, the weight percentage of active carbon powders is 10% to 20% of the total weight of zero valent iron ($Fe^0$), zero valent nickel ($Ni^0$), and active carbon powders. In one aspect, the weight percentage of active carbon powders is about 15% of the total weight of zero valent iron ($Fe^0$), zero valent nickel ($Ni^0$), and active carbon powders.

In one embodiment, the present disclosure provides a method of degradation of one or more perfluoroalkyl-containing compound, wherein perfluoroalkyl-containing compound comprises branched or straight chain perfluoroalkyl-containing compound.

In one embodiment, the present disclosure provides a method of degradation of one or more perfluoroalkyl-containing compound, wherein perfluoroalkyl-containing compound comprises branched or straight chain perfluoroalkyl sulfonate.

In one embodiment, the present disclosure provides a method of degradation of one or more perfluoroalkyl-containing compound, wherein perfluoroalkyl-containing compound comprises branched or straight chain perfluorooctane sulfonate.

In one embodiment, the present disclosure provides a method of degradation of one or more perfluoroalkyl-containing compound, wherein at least 20% of the total amount of the original perfluoroalkyl-containing compound is degraded. In one aspect, at least 30% of the total amount of the original perfluoroalkyl-containing compound is degraded. In one aspect, at least 40% of the total amount of the original perfluoroalkyl-containing compound is degraded. In one aspect, 20-90% of the total amount of the original perfluoroalkyl-containing compound is degraded. In one aspect, 30-60% of the total amount of the original perfluoroalkyl-containing compound is degraded. In one aspect, 30-50% of the total amount of the original perfluoroalkyl-containing compound is degraded. In one aspect, the degradation percentage is calculated for a period of 1-20 days. In one aspect, the degradation percentage is calculated for a period of 1-5 days.

Materials and Methods

Chemicals.

Iron (II) chloride tetrahydrate ($FeCl_2.4H_2O$, 98%), sodium borohydride ($NaBH_4$, 99%), nickel chloride hexahydrate (NiCl$_2$·6H$_2$O, 98%), and heptadecafluorooctane-sulfonic acid potassium salt (PFOSK, C$_8$F$_{17}$SO$_3$K, 98%), were purchased from Sigma-Aldrich (St. Louis, Mo., USA). Ammonium acetate, formic acid, and methanol were HPLC grade and purchased from Fisher Scientific (Pittsburgh, Pa., USA).

Synthesis of nFe$^0$, nFe$^0$-AC, nNi$^0$Fe$^0$ and nNi$^0$Fe$^0$-AC particles: Zero valent iron nanoparticles (nFe$^0$ NPs) and zero valent iron-nickel nanoparticle (nNi$^0$Fe$^0$ NPs) were synthesized in an anaerobic chamber under N$_2$ gas and variations in synthesis stirring time (SST) when plating 2 wt % Ni onto nFe$^0$, which included 1-h, 2-h, and 3-h SSTs. Briefly, 0.35 M FeCl$_2$·4H$_2$O was reduced with 0.5 M NaBH$_4$ by dropwise addition under mechanical stirring (600 rpm) to form Fe$^0$ NPs. The nFe$^0$ NPs were washed three times with deoxygenated deionized (DI, 18.2 MΩ cm) water. Zero valent nickel (Ni$^0$) was plated onto nFe$^0$ by reacting nFe$^0$ NPs with aqueous 0.1 M NiCl$_2$·6H$_2$O while stirring strongly (600 rpm) for 1, 2, or 3-h SSTs followed by sonication (30 min) and washing with deoxygenated DI water. For AC-supported NPs, AC was mixed with FeCl$_2$·4H$_2$O before adding NaBH$_4$. All particles (nFe$^0$, nFe$^0$-AC, nNi$^0$Fe$^0$ and nNi$^0$Fe$^0$-AC) were synthesized immediately prior to use. Transmission electron microscopy (TEM)-energy dispersive X-ray (EDX) analysis (FIG. S1) confirmed Ni at ≈2 wt % in nNi$^0$Fe$^0$.

Batch Reactions.

Batch reactions in 60-mL HDPE (high-density polyethylene) vials sealed with rubber crimp caps were carried out in an anaerobic chamber under N$_2$ gas for a 5-d period with each 1-h SST particle type in triplicate. For nNi$^0$Fe$^0$-AC, the effect of SST was assessed over a 1-d reaction period. In addition, an exploratory kinetic study with 1-h SST nNi$^0$Fe$^0$-AC quenched at 1 d, 5 d, and 10 d in duplicate and at 20 d (single sample) was conducted. For all samples, 10-mL~6 µM PFOS was mixed with 0.2 g particles and rotated (120 rpm) at room temperature (22±2° C.) or in a temperature-controlled chamber at 60° C. A PFOS control (no particles) and a matrix control (10-mL water with particles but no PFOS) were included for each reaction set. Reactions were stopped by immersion into an ice slurry.

Particle Characterization.

TEM, SEM, and energy dispersive X-ray (EDX) analysis were used to characterize the nNi$^0$Fe$^0$-AC (details in SI). X-ray photoelectron spectroscopy (XPS) was used to acquire individual element scans for Fe 2p (695-730 eV), Ni 2p (834-875 eV), F (675-695 eV), and S (158-178 eV). Average NP diameter and particle size distribution were measured using imaging software (Image J) from the SEM images.

HPLC/MS/MS.

L-PFOS (single peak) and Br-PFOS (single broad peak integrated) concentrations were quantified using an Agilent 6460 Triple-Quad with online SPE with a 2.7 µm reversed phase poroshell 120 EC-C18 (3.0 mm×50 mm) column. Polypropylene vials and sample dilution of 1:1 with MeOH were used to avoid PFASs adsorption and matrix effects. For analysis, an external standard curve was constructed and sodium perfluoro-[$^{13}$C8]octane sulfonate (M8PFOS) was added to each sample as internal standard. The mobile phase consisted of 2 mM ammonium acetate in water and 2 mM ammonium acetate in methanol at 0.5 mL/min. The gradient conditions are: 3% B for 0.85 min, 60% B for 2 min, and 100% by 6 min. The mobile phases for the online SPE are 0.1% formic acid in water and 100% methanol. The injection volume was 300 µL and the column temperature was maintained at 55° C.

Triple Quadrapole Time-of-Flight MS.

All samples for organic metabolites detection and identification were analyzed using a Shimadzu high performance reverse-phase liquid chromatography (HPLC) system couple with a Sciex5600 Triple Quadrapole Time-of-Flight (QTOF) MS. Separation was performed with a Kinetex EVO C18 (2×0.1×100 mm, 5 µm, 100 Å) column equipped with a Phenomenex AFO-8497 filter. The column temperature was maintained at 40° C. and 50 µL of sample was injected at a flow-rate of 0.75 ml/min. Mobile phases A and B were water with 0.15% acetic acid and 20 mM ammonium acetate in methanol, respectively. The gradient started with 30% of solvent B until 0.1 min and increased to 100% B within 5 min, which was kept for another 5 min. The starting conditions were restored within 0.1 min and kept it for 2 min for re-equilibration. Samples were injected in scan mode (ESI+ and ESI−) and a mass defect filtering was used to identify novel decomposition products. The mass calibration of the instrument was carried out with an ESI− and ESI+ calibration solution for TripleTOF 5600 for negative and positive mode, respectively. The automated calibration device system (CDS) was set to perform an external calibration after each sample injection. A sequential window acquisition of all theoretical fragment ion spectra (SWATH) acquisition mode was used to detect low-levels of intermediates in our complex matrix. In total, 17 product ion experiments were performed with a mass range from 100 to 1200 m/z and with an overlap of 1 m/z. The accumulation time was 50 ms with a total cycle time of 950 ms. Data acquisition and processing were performed using an Analyst 1.7 and PeakView 0.15 software, respectively.

Ion Chromatography.

Inorganic metabolites (fluoride and sulfate) were quantified using an Ion chromatography (ICS-3000, Dionex) with an IonPac AS11-HC column (4.0×250 mm), IonPac AG11-HC guard column (4.0×50 mm) and sodium hydroxide (NaOH) in water as a mobile phase. The column was allowed to equilibrate for 30 min before each batch. An optimum gradient separation method with a flow rate of 1.5 mL/min, a column temperature of 30° C. and an injection volume of 50 µL was employed for each anion. For fluoride, the eluent concentration was kept at 3 mM for the first 7 min, then ramped to 30 mM to elute the excess of chloride ions to 15 min, and finally maintained to 3 mM over 10 min. For sulfate, 15 mM sodium hydroxide was maintained for 10 min to separate sulfate and sulfite anions, and then increased to 30 mM for 5 min and finally to 15 mM for another 10 min.

Nanoparticle Analysis

Particle Characterization.

Transmission electron microscopy (TEM), energy dispersive X-ray (EDX), and scanning electron microscope (SEM) were used to characterize nNi$^0$Fe$^0$-AC. Micrographs were obtained using a FEI Tecnai G2 20 TEM. A droplet of aqueous sample containing the nanoparticles was placed on a carbon-coated Cu grid, the excess aqueous volume removed with a filter paper and the grid air-dried for 2 min. TEM images was analyzed using a Digital Micrograph software (Version 3.5.2, Gatan Company) to measure particle size. SEM images were obtained using an electron microscope ULTRA 55 (Zeiss). Samples were mounted on an adhesive double-sided carbon tape of 0.5 cm by 0.5 cm before observation. X-ray photoelectron spectrometer (XPS) analysis was performed using a Thermo Scientific K-Alpha XPS instrument with a monochromatic Al Kα X-ray source. Individual element scans were completed for Fe 2p (695-730 eV), Ni 2p (834-875 eV), and F (675-695 eV/for desorption confirmation). After the 5 days of reaction, particles were dried overnight at 90° C. and mounted on a small carbon tape of 0.5 cm by 0.5 cm prior to XPS analysis.

XPS analysis. XPS analysis of the nNi⁰Fe⁰-AC reacted with PFOS and matrix controls both show the presence of Ni and Fe. The nNi⁰Fe⁰-AC matrix presented three peaks with binding energy at 711.28, 719.18, and 724.88 eV (FIG. S2a). The 711.28 and 724.88 eV are from the Fe $2p_{3/2}$ and Fe $2p_{1/2}$, respectively. While the 719.18 correspond to the satellite peak of Fe $2p_{3/2}$ located approximately 8 eV higher of the main Fe $2p_{3/2}$. The peak at 719.18 eV presence only in the nNi⁰Fe⁰-AC matrix controls is characteristic of maghemite ($\gamma$-$Fe_2O_3$) or hematite ($\alpha$-$Fe_2O_3$).[2] On the other hand, the nNi⁰Fe⁰-AC reacted with PFOS had only two peaks at 710.39 and 724.21 eV corresponding to Fe $2p_{3/2}$ and Fe $2p_{1/2}$, respectively (FIG. S2a). There was not a satellite peak of Fe $2p_{3/2}$ on the reacting samples. This spectrum is characteristic of magnetite ($Fe_3O_4$)[3,4] and it is only observed in the particles reacted with PFOS. The formation of $Fe_3O_4$ from Fe⁰ (in subcritical water) after reaction with PFOS has been reported previously by Hori et al.[5] The presence of $Fe_3O_4$ on particle surface indicates the sustained reactivity of nNi⁰Fe⁰-AC. Magnetite is a $Fe^{2+}$— $Fe^{3+}$ mixed valence metal that has the highest conductivity and the lowest electrical resistivity of all iron oxides.[6,7] Then, the reduction of PFOS occurs in the $Fe_3O_4$ surface with Ni⁰ and Fe⁰ as the final electron donors. Under anaerobic conditions, $Fe_3O_4$ will be generated following the next equations:

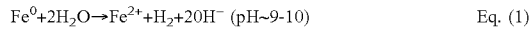
$$Fe^0 + 2H_2O \rightarrow Fe^{2+} + H_2 + 2OH^- \text{ (pH~9-10)} \qquad \text{Eq. (1)}$$

$$3Fe^{2+} + 4H_2O \rightarrow Fe_3O_4 + 8H^+ + 2e^- \qquad \text{Eq. (2)}$$

Thus, there was two different formation of iron oxides in the matrix controls and nNi⁰Fe⁰-AC reacted with PFOS. $Fe_3O_4$ formed on particles reacted with PFOS whereas $Fe_2O_3$ was generated in matrix controls. The catalytic efficiency of $Fe_2O_3$ can be expected to be significantly lower than that of $Fe_3O_4$ due to the absence of $Fe^{2+}$ in its structure.

Additionally, for nickel spectra for nNi⁰Fe⁰-AC reacted with PFOS four peaks were observed at 855.58, 861.58, 872.98, and 879.48 eV (FIG. S2b.). The peaks at 855.58 and 861.58 are the Ni $2p_{3/2}$ main peak and its corresponding satellite peak. The Ni $2p_{1/2}$ peak is at 872.98 eV with a satellite peak near 879.48 eV. Kim and Winograd,[9] reported that the electron binding energy for Ni $2p_{3/2}$ (main and satellite peaks) around 855.8 and 861.4 eV are characteristic of $Ni_2O_3$. On the other hand, no nickel metal or oxides/hydroxides were detected in the nNi⁰Fe⁰-AC matrix controls (no PFOS). According to this results, nickel oxidation when reacting with PFOS appears to occur as follows:

$$Ni^0 + 2H_2O \rightarrow Ni^{2+} + H_2 + 2OH^- \qquad \text{Eq. (3)}$$

$$2Ni^{2+} + 3H_2O \rightarrow Ni_2O_3 + 6H^+ + 2e^- \qquad \text{Eq. (4)}$$

The oxygen spectrum of the nNi⁰Fe⁰-AC reacted with PFOS and the matrix controls both show two peaks at ~530 and ~532 eV, but with different intensities. The first peak (530 eV) is characteristic of metal oxides and the second one (532 eV) of metal carbonates (FIG. S3). A lower intensity peak for the metal oxide and higher peak intensity for the metal carbonate peak are observed in the in the nNi⁰Fe⁰-AC reacted with PFOS compared to matrix controls. The lower intensity of metal oxides in the PFOS reacted nNi⁰Fe⁰-AC is related to a different formation of metal oxides ($Fe_3O_4$ vs $Fe_2O_3$). The higher intensity of the metal carbonate peak in the reacted sample is correlated to the detection of carbonate ions in our kinetic study.

Results and Discussion

PFOS loss after reacting with particles may be due to either strong/irreversible sorption or transformation. For reductive transformation of PFOS, possibilities include cleavage of the sulfonate group and dehalogenation. A maximum of 17 moles of $F^-$ and one mole of $SO_4^{2-}$ can be generated per mole of PFOS. Only when PFOS removal is coupled to generation of inorganic products above background levels can PFOS transformation be claimed. Further evidence may include a suite of organic products, which was explored for a subset of samples.

5-d PFOS Reactions with 1-h SST Particles:

For nFe⁰ at both temperatures, no degradation was observed with all PFOS recovered in two extractions. At 22° C., addition of Ni⁰ to nFe⁰ or supporting NPs onto AC (nFe⁰-AC and nNi⁰Fe⁰-AC) resulted in similar losses of 10±3% (nNi⁰Fe⁰), 10±3% (nFe⁰-AC) and 12±2% (nNi⁰Fe⁰-AC) with no observable sulfate generation. In contrast, at 60° C., both PFOS loss and $SO_4^{2-}$ generation were observed with nFe⁰-AC, nNi⁰Fe⁰ and nNi⁰Fe⁰-AC. Increased pressure (presumably from $H_2$ gas formation) was also observed for these samples with the highest pressures noted for nNi⁰Fe⁰-AC, which also resulted in increased PFOS loss (35±7%) and sulfate generation. Quantifying $F^-$ was problematic at both reaction temperatures due to interfering peaks. Multiple peaks in the retention time ($t_r$) window of 3.25 to 4.15 min overlapped with the $F^-$ peak ($t_r$ 3.4 min) in the 60° C. reactions whereas only one interfering peak was observed in the 22° C. treatment. Also in reactions where PFOS removal was observed regardless of product generation, pH increased to pH>9. For nFe⁰ where no PFOS was removed, pH remained acidic (pH 5.6). Matrix and PFOS controls had final pH values of 5.8 and 6.6, respectively.

Role of AC.

AC was hypothesized to decrease reactive NP aggregation and increase contaminant sorption, thus increasing reactivity towards PFOS removal and transformation. The AC support increased PFOS sorption with PFOS in the aqueous phase relative to total PFOS decreasing from 50% to 30% when NPs were supported on AC. At 22° C., there was no confirmatory evidence of transformation, thus irreversible sorption as significant contribution to PFOS removal cannot be ruled out. However, at 60° C. where both PFOS removal and $SO_4^{2-}$ generation increased and PFOS sorption as an exothermic process decreased, the contribution from irreversible sorption was likely insignificant. Furthermore, XPS spectra for 1-h SST nNi⁰Fe⁰-AC reacted at 60° C. shows the disappearance of the F1s peak of PFOS after particle extraction. Several metals detected in the AC may have increased PFOS transformation reactivity including Ce, Cu, Fe, and Sr. Additionally, AC has been shown to be a redox mediator in the reduction of azo dyes, which was hypothesized to occur through the channeling of electrons through quinone groups on the AC surface. Quinate is reported to elute before $F^-$ on the AS11-HC column used[38], which may be one of the interfering peaks observed.

Exploratory Kinetic Study.

In the kinetic study with 1-h SST nNi⁰Fe⁰-AC at 60° C., PFOS removal increased significantly between 1 and 5 d from 25±4% to 35±7% and then appeared to plateau; differences were not statistically significant between 5, 10 and 20 days. $SO_4^{2-}$ generation also increased over time, but not proportionally. In 1-d samples, only 0.017±0.019 mol $SO_4^{2-}$/mol PFOS removed was observed whereas in 5 d to 20 d samples, an average of 0.78±0.08 mol $SO_4^{2-}$/mol PFOS removed. Although it was not able to quantify $F^-$, greater increases in $SO_4^{2-}$ after 1 d with little subsequent increase in PFOS removal suggests that defluorination occurs prior to or at a faster rate than cleavage of the C—S bond. Although $SO_3^{2-}/SO_4^{2-}$ may be adsorbed to the particles, adsorption is pH-dependent and pH values at the time of each sampling ranged between 8.58 and 9.43 where anion adsorption is expected to be small to negligible.

Effect of Synthesis Stirring Time (SST) on $nNi^0Fe^0$-AC Reactivity (1-d Reactions).

Increasing the mechanical synthesis stirring time (SST) from 1 h to 3 h when plating $Ni^0$ to $nFe^0$-AC resulted in increasing PFOS removal and less variability between replicates. In these 1-d reactions, PFOS removal increased from 25±1.3% (1-h SST) to 34±0.01% (2-h SST) to 48±1.4% (3-h SST) (FIG. 3), which included increases in L-PFOS removal: 10% (1-h SST)<27% (2-h SST)<33% (3-h SST) (FIG. 3b). Regardless of SST, all $nNi^0Fe^0$ NPs had a similar particle size distribution from ~20 to 70 nm. Increased SST, therefore, may have improved $Ni^0$ distribution, thus increasing reactivity. Interestingly, for 1-h and 2-h SST, final pH values were all acidic in contrast to 1-h SST ($pH_{1h}$=9.16 vs $pH_{2h}$=4.97 and $pH_{3h}$=4.53). These pH differences are hypothesized to be due to changes in the oxidation rate of Fe in the NPs. Fe-oxide formation was observed in XPS analysis of the particles. Also TEM images of $nNi^0Fe^0$-AC revealed cubic shapes for the 1-h SST NPs which become increasingly spherical (amorphic) at longer SSTs, which parallels the decreases in pH.

Decreasing pH affected quantitation of $SO_4^{2-}$ as well. $SO_4^{2-}$ generation was easily quantified in the 5-d reactions with the 1-h SST particles where final pH>9. However, as pH decreased substantially with the 2-h and 3-h SST particles, aqueous $SO_3^{2-}/SO_4^{2-}$ concentrations were below LOQ or highly variable likely due to increased $SO_3^{2-}/SO_4^{2-}$ sorption to the particles. $F^-$ sorption will also increase with decreasing pH; however, increasing SST also resulted in decreases in the unknown peaks interfering with $F^-$ quantification allowing some confirmation of $F^-$ generation in the 2-h SST $nNi^0 Fe^0$ though highly variable (5.0±8.7 moles $F^-$ per moles PFOS removed). Large variation in $F^-$ and $SO_4^{2-}$ concentrations between replicates is also likely due to the variation in the generation of acidic sites on the particle surfaces.

Organic Intermediates/Products and Pathways.

Intermediates were identified through an accurate mass approach with an average mass error tolerance of less than 10 ppm, a signal-to-noise ratio of 10, and an isotope distribution error between theoretical and expected of <1%). Poly/per-fluorinated intermediates found in only particle extracts reacted with PFOS (not PFOS or matrix controls) are summarized in Table 1 along with key parameters used in the mass identification. The MS and MS/MS data suggest that one pathway starts with one F/H replacement followed by further defluorohydrogenation yielding $C_8H_2F_{15}SO_3$, $C_8H_4F_{13}SO_3$, $C_8H_6F_{11}SO_3$, $C_8H_8F_9SO_3$, and $C_8H_{10}F_7SO_3$ (upper list in Table 1). An alternate pathway leads to double bond formation producing $C_8H_2F_{13}SO_3$, $C_8H_3F_{12}SO_3$, $C_8H_5F_{10}SO_3$, $C_8H_6F_9SO_3$, $C_8H_7F_8SO_3$, $C_8H_8F_7SO_3$, and $C_8H_{10}F_5SO_3$ (lower list in Table 1). Most intermediates were generated in the first day with subsequent transformation over time. Several other unidentified peaks were detected in the aqueous and headspace samples, which require further investigation.

TABLE 1

Summary of the intermediates identified in the extracted samples. For reference, PFOS m/z is 498.9297 with a retention time of 8.8817 min.

| Theoretical m/z | Observed m/z | Difference Error (ppm)[a] | Formula | $t_r$[b] |
|---|---|---|---|---|
| All C—C Single bonds | | | | |
| 480.9391 | 480.9388 | 0.5164 | $C_8HF_{16}SO_3$ | 8.3025 |
| 462.9485 | 462.9471 | 3.0341 | $C_8H_2F_{15}SO_3$ | 8.4606 |
| 426.9674 | 426.9672 | 0.3604 | $C_8H_4F_{13}SO_3$ | 8.4185 |
| 390.9862 | 390.9856 | 1.4440 | $C_8H_6F_{11}SO_3$ | 7.8339 |
| 355.0050 | 355.0050 | 0.1727 | $C_8H_8F_9SO_3$ | 7.7603 |
| 319.0239 | 319.0240 | 0.2660 | $C_8H_{10}F_7SO_3$ | 7.7786 |
| C—C Double bond formation | | | | |
| 424.9520 | 424.9517 | 0.7634 | $C_8H_2F_{13}SO_3$ | 8.1151 |
| 406.9611 | 406.9611 | 0.0108 | $C_8H_3F_{12}SO_3$ | 8.0383 |
| 370.9800 | 370.9786 | 3.5899 | $C_8H_5F_{10}SO_3$ | 7.7286 |
| 352.9890 | 352.9893 | 0.8149 | $C_8H_6F_9SO_3$ | 7.5933 |
| 334.9988 | 334.9989 | 0.1041 | $C_8H_7F_8SO_3$ | 7.6708 |
| 317.0082 | 317.0081 | 0.3186 | $C_8H_8F_7SO_3$ | 7.6039 |
| 281.0271 | 281.0272 | 0.3216 | $C_8H_{10}F_5SO_3$ | 1.5698 |

[a]Difference between exact theoretical mass and experimentally measured mass × $10^6$;
[b]Retention time.

Those skilled in the art will recognize that numerous modifications can be made to the specific implementations described above. The implementations should not be limited to the particular limitations described. Other implementations may be possible.

We claim:

1. A method of degradation of one or more perfluoroalkyl-containing compound, wherein the method comprises:
   providing a mixture comprising one or more perfluoroalkyl-containing compound, wherein the perfluoroalkyl-containing compound is branched or straight chain perfluoroalkyl-containing sulfonate;
   providing particles comprising zero valent iron ($Fe^0$) and zero valent nickel ($Ni^0$) to the mixture, wherein said zero valent iron ($Fe^0$) comprises $Fe^0$ nanoparticles, wherein the surface of $Fe^0$ nanoparticles is coated with zero valent nickel ($Ni^0$); and wherein zero valent iron ($Fe^0$) and zero valent nickel ($Ni^0$) are supported by active carbon powders, and
   degrading the perfluoroalkyl-containing compound in the mixture, wherein the degradation involves cleavage of the sulfonate group and defluorination of said branched or straight chain perfluoroalkyl-containing sulfonate to provide inorganic sulfate,
   wherein the degradation is carried out between 25-100° C.

2. The method of claim 1, wherein the zero valent iron ($Fe^0$) comprises $Fe^0$ nanoparticles, and wherein the surface of $Fe^0$ nanoparticles is plated with zero valent nickel ($Ni^0$).

3. The method of claim 1, wherein the weight percentage of the zero valent nickel ($Ni^0$) is 0.1% to 15% of the total weight of zero valent iron ($Fe^0$) and zero valent nickel ($Ni^0$).

4. The method of claim 3, wherein the weight percentage of the zero valent nickel ($Ni^0$) is 0.5% to 5% of the total weight of zero valent iron ($Fe^0$) and zero valent nickel ($Ni^0$).

5. The method of claim 1, wherein the weight percentage of active carbon powders is 1% to 30% of the total weight of zero valent iron ($Fe^0$), zero valent nickel ($Ni^0$), and active carbon powders.

6. The method of claim 5, wherein the weight percentage of active carbon powders is 5% to 20% of the total weight of zero valent iron ($Fe^0$), zero valent nickel ($Ni^0$), and active carbon powders.

7. The method of claim 1, wherein the degradation is carried out between 45-80° C.

8. The method of claim 1, wherein the degradation is carried out for in-situ groundwater remediation.

9. The method of claim 1, wherein the perfluoroalkyl-containing compound comprises branched or straight chain perfluorooctane sulfonate (PFOS).

10. The method of claim 1, wherein at least 20% of the total amount of the original perfluoroalkyl-containing compound is degraded.

* * * * *